United States Patent Office 2,969,870
Patented Jan. 31, 1961

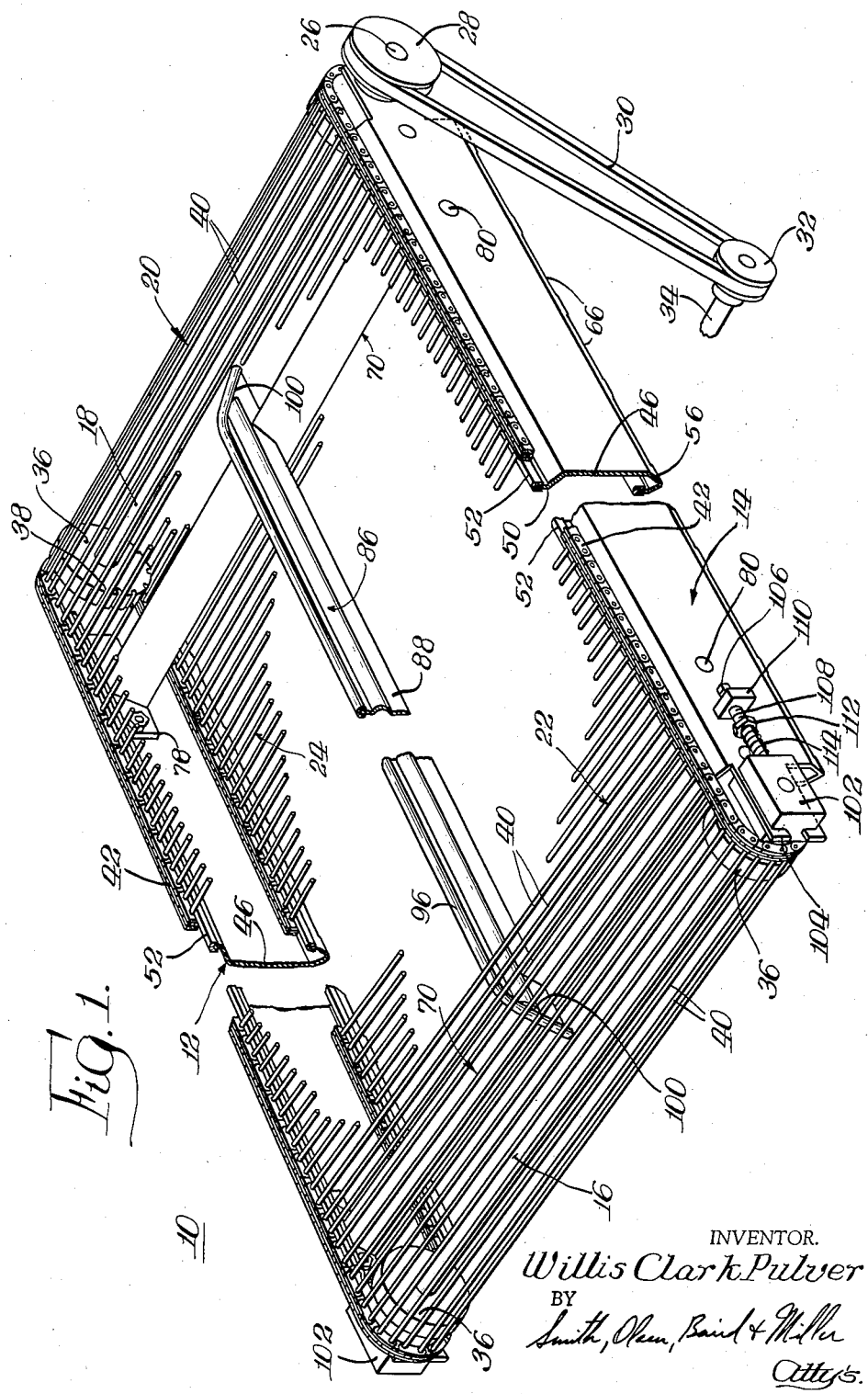

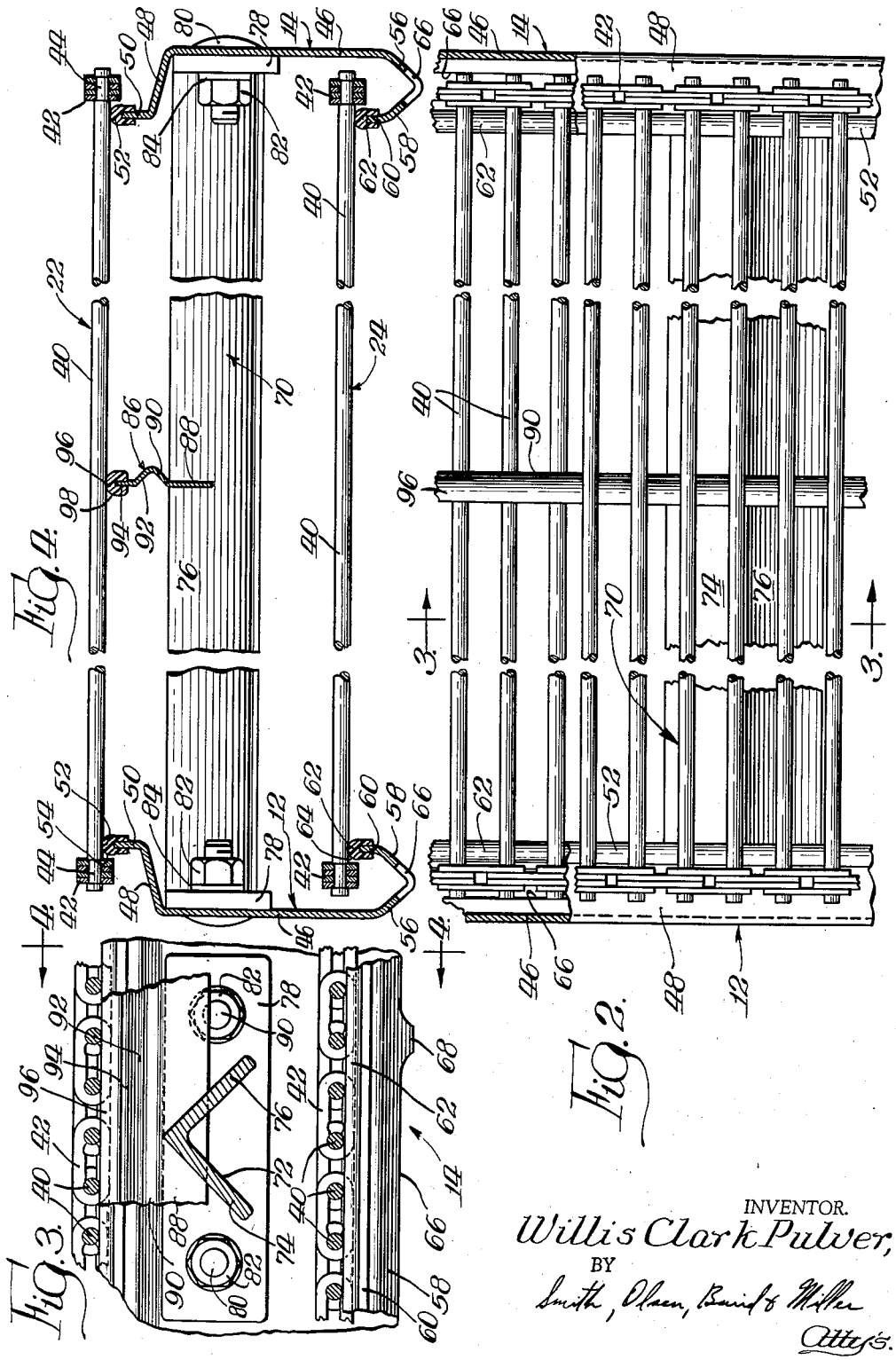

2,969,870

CONVEYOR CONSTRUCTION

Willis Clark Pulver, Oak Lawn, Ill., assignor to Velten & Pulver Inc., Chicago Ridge, Ill., a corporation of Illinois Filed July 9, 1957, Ser. No. 670,720

8 Claims. (Cl. 198—195)

This invention relates to conveyor structures and specifically to conveyors of the endless type which are particularly adaptable for use in food processing plants such as bakeries and the like, wherein sanitary conditions must be maintained at all times.

The conveyor of the present invention is of the endless belt type and is flexible in the sense that its direction of travel may be reversed at the opposite ends thereof. Ordinarily only the upper reach or flight of the conveyor belt supports a load and, accordingly, this load bearing portion of the conveyor belt must be supported to prevent excessive sagging when substantial loads are placed thereon. Several methods have been utilized heretofore to support load bearing flights of such conveyor belts. In one such system the conveyor belt is of a type which is flexible in the longitudinal direction of travel thereof but is substantially rigid transversely thereto. It has been the practice to support such belts by means of stationary rails over which the belt has been moved in a sliding motion. In order to provide suitable support, the stationary rails have had a substantial bearing surface and bearing contact with the conveyor belt. Such support systems are entirely satisfactory in many applications but are not satisfactory for use in food processing plants. In food processing plants food particles such as crumbs, dirt and the like tend to collect upon any flat surfaces of substantial horizontal extent whereby to create unsanitary conditions. Such surfaces are also difficult to clean. In addition a bearing support of this type can present a substantial frictional load whereby to reduce the efficiency of the conveyor and to limit the useful life of the bearing parts thereof.

It is an important object of the present invention to provide an improved conveyor of the endless-belt type useful where high standards of sanitation must be maintained.

In connection with the foregoing object, it is another object of the invention to provide a conveyor of the type set forth having no horizontal planar surface of any appreciable extent either on the movable belt or on the supporting structure therefor upon which dirt or food particles may collect.

Yet another object of the invention is to provide an improved endless conveyor having improved means for supporting the load bearing flight of the conveyor belt and more specifically a support structure which is quiet in operation, reduces frictional losses and increases the efficiency of the conveyor.

Still another object of the invention is to provide an improved support frame for an endless conveyor of the type set forth which incorporates therein as an integral part thereof improved supports for the load bearing flight of the belt and the return flight of the belt.

A further object of the invention is to provide a support for an endless-belt in a conveyor of the type set forth which provides substantially point contact support for the belt.

These and other objects and advantages of the invention will be better understood from the following description when taken in conjunction with the accompanying drawings. In the drawings wherein like reference numerals have been utilized to designate like parts throughout:

Figure 1 is a perspective view from above of a conveyor made in accordance with and embodying the principles of the present invention, with portions of the conveyor being broken away for clarity;

Figure 2 is a fragmentary plan view with certain portions broken away of the conveyor of Figure 1;

Figure 3 is a fragmentary view in longitudinal section with certain parts broken away of the conveyor substantially as seen in the direction of the arrows along the line 3—3 of Figure 2; and Figure 4 is a view in transverse vertical section through the conveyor substantially as seen in the direction of the arrows along the line 4—4 of Figure 3.

There is shown in Figure 1 a conveyor generally designated by the numeral 10 made in accordance with and embodying the principles of the present invention. Conveyor 10 includes a pair of longitudinally extending frame members generally designated by the numerals 12 and 14 which may be supported by a plurality of legs or the like, not shown. Mounted on frame members 12 and 14 adjacent one end thereof is a first shaft 16, and a second shaft 18 is journaled therein at the opposite ends thereof. Shaft 16 has been shown as an idler shaft and shaft 18 as a driven shaft. Mounted upon and supported by shafts 16 and 18 is a belt generally designated by the numeral 20 and including an upper load carrying reach or flight 22 and a lower return reach or flight 24.

Conveyor belt 20 is driven by shaft 18. More specifically, one end 26 of shaft 18 extends beyond frame member 14 and has fixedly attached thereto a pulley 28. A suitable drive belt 30 interconnects pulley 28 and a drive pulley 32. Pulley 32 is mounted upon a power shaft 34 which is driven by a prime mover (not shown). The conveyor belt 20 is more particularly mounted upon a plurality of sprockets 36. One pair of sprockets 36 is mounted on shaft 18 at a point thereon spaced inwardly from frame members 12 and 14 and a second pair of sprockets 36 is similarly positioned upon shaft 16. Sprockets 36 may be fabricated of metal or fiber and each has provided on its periphery a plurality of evenly spaced transverse slots 38 for a purpose which will be understood more fully hereinafter.

The conveyor belt 20 comprises a plurality of evenly spaced cylindrical transverse rods 40. Rods 40 are disposed with the longitudinal ends thereof perpendicular to the direction of travel of conveyor 20 and are spaced apart and held in spaced apart position by a plurality of links 42 which interconnect adjacent rods 40. Rods 40 and links 42 interconnect to provide an endless conveyor belt. The rods 40 disposed upwardly as viewed in the drawings form the load bearing conveyor flight designated by the numeral 22 and the rods 40 disposed beneath are non-load bearing and provide the return flight designated generally by the numeral 24. The details of the construction and interconnection of the conveyor belt 20 are more fully set forth in Patent Number 2,753,039 granted July 3, 1956 to Frank X. Velten and Willis Clark Pulver. Only so much of the details of construction as is required for the purposes of the present invention will be set forth herein. Referring to Figure 4 it will be seen that each rod 40 has a reduced cylindrical portion 44 at each end thereof which passes through four links 42. It will be seen from Figure 2 that two links 42 interconnect each end of adjacent rods 40.

Referring now more specifically to Figures 2, 3 and 4 of the drawings the construction of the frame members 12 and 14 will be described in detail. Frame member 12 includes a substantially vertically disposed plate or web portion 46 which extends substantially the length thereof. Formed on the upper edge of plate 46 is an inwardly directed flange 48 which is disposed at an obtuse angle with respect to plate 46, the angle between plate 46 and flange 48 being for example 110°. The inwardly directed edge of flange 48 is provided with an upstanding support flange 50 which is disposed substantially parallel to plate 46 and extends upwardly and away therefrom. There is provided on the upper edge of support flange 50 a bearing member 52 which extends the length of flange 50, flange 50 terminating at a point spaced from shafts 16 and 18 (see Figure 1). Bearing member 52 is formed with a slot in the bottom thereof to receive flange 50 therein and the upper surface 54 is rounded or formed part-cylindrical in shape. The rods 40 are adapted to contact a portion of the cylindrical surface 54 whereby to have substantially point contact therewith.

A downwardly extending flange 56 is provided along the lower edge of plate 46, flange 56 being disposed at an obtuse angle of approximately 135° with respect to plate 46. Formed integral with and extending upwardly from flange 56 is another flange 58 disposed substantially perpendicular thereto. The upper edge of flange 58 carries a support flange 60 which is disposed substantially parallel to plate 56. Flange 60 also lies directly beneath flange 50 and the corresponding faces thereof lie substantially in the same planes. Mounted on flange 60 is a bearing member 62 similar to bearing member 52 described above and having a rounded part-cylindrical bearing surface 64 adapted to support rods 40 with substantially a point contact.

As may be best seen in Figure 4 of the drawings no horizontal planar surface is presented by frame member 12. All exposed surfaces which are not vertical including flanges 48, 56 and 58 are inclined at substantial angles with respect to the horizontal whereby crumbs and dirt will fall therefrom. In addition the junction between flanges 56 and 58 is apertured as at 66 whereby only relatively short connecting portions 68 are left which might collect dirt and crumbs. The length of the apertures 66 is many times the length of connecting portions 68. Connecting portions 68 have sufficient mechanical strength to support the non-loaded or return reach 24 of conveyor 20.

Frame member 14 is substantially identical to frame member 12 but is disposed end for end whereby the flanges face inwardly toward each other. Accordingly, the same reference numerals for the various parts of frame member 12 have been applied to the corresponding parts of frame member 14.

It is necessary to hold the frame members 12 and 14 spaced apart a suitable predetermined distance. To this end transverse frame members 70 have been provided, two having been shown for purposes of illustration. Each frame member 70 includes an angle iron piece 72 having a pair of right angularly disposed sides 74 and 76. Attached to each end of angle iron piece 72 is a substantially rectangular plate 78, plate 78 being secured in any suitable manner to angle iron 72 such as by welding. A pair of apertures is provided in each plate 78 to receive therethrough bolts 80. Bolts 80 also pass through aligned apertures in the corresponding frame members 12 and 14. Each bolt 80 is provided with a nut 82 and a lock washer 84. Transverse frame members 70 serve to hold the longitudinal frame members 12 and 14 in suitable spaced apart relationship.

The construction of transverse frame members 70 is such as to facilitate cleaning and to minimize retention of dirt and dust thereby. By reference to Figure 3 it will be seen that the sides 74 and 76 of angle iron 72 are disposed so that the upper surfaces thereof are inclined downwardly at an angle of approximately 45°. In addition from Figure 4 it can be seen that the plate 78, the shank of bolt 80, the nut 82 and washer 84 are all disposed below and are substantially covered by frame flange 48. Furthermore the surfaces of the shank of bolt 80 and nut 82 have very small portions thereof disposed in a horizontal plane and therefore also tend to shed dirt and food particles.

Means is provided to support the transverse conveyor rods 40 at substantially the center thereof in the upper load carrying flight 22. To this end a plate generally designated by the numeral 86 is provided which extends substantially the length of the upper flight 22 of the conveyor 20. Plate 86 is supported by the transverse frame members 70 and more specifically has a substantially vertical portion 88 which is received in slots formed in angle iron pieces 72. The portion of plate 86 immediately above the vertical portion 88 is bent at an obtuse angle therewith to provide an offset flange 90. Integral with flange 90 is a second offset flange 92 extending in the direction opposite to flange 90 and terminating in an integral upstanding support portion 94. Portion 94 is positioned substantially above portion 88 and portions 88 and 94 have the corresponding surfaces thereof lying in the same planes. A bearing member 96 is supported upon portion 94 and extends the length thereof. The upper surface 98 of bearing member 96 contacting rods 40 is curved whereby to provide substantially only point contact between rods 40 and bearing member 96. The ends of plate 86 are curved downwardly as at 100 and the bearing member 96 is similarly curved downwardly.

The position of shaft 16 with respect to frame members 12 and 14 is adjustable whereby to tighten conveyor 20 when desired. More specifically the ends of shafts 16 project beyond frame members 12 and 14 and are received in bearing blocks 102. Bearing blocks 102 are slidably mounted by means of track members 104 formed on frame members 12 and 14 cooperating with slots in bearing blocks 102. Bearing blocks 102 are spring pressed in a direction to take up slack. For this purpose each bearing block 102 is provided with a longitudinally extending rod 106 slidably received in a sleeve 108 which is threadedly supported in a block 110 fixed to the side of frame members 12 and 14. The threaded sleeves 108 are each provided with a hexagonal integral head 112 by which the sleeves may be rotated and their positions changed longitudinally with respect to the support blocks 110. A compression spring 114 is disposed about each shaft 106 between each bearing block 102 and nut 112. Accordingly, the bearing blocks 102 and the associated shaft 16 are urged to the left as viewed in Figure 1 to maintain a high state of tension in conveyor 20. Rods 40 are spaced to engage in slots 38 of sprockets 36 to be guided thereby and driven by sprockets 36 on shaft 18.

Preferably all of the parts except the bearing members 52, 64 and 96 are formed of metal so that they can be easily cleaned and sterilized. The bearing members 52, 62 and 96 are formed of a synthetic organic plastic, a preferred material being a polyamide such as that sold under the trademark "Nylon." Such materials are relatively hard whereby to give a good bearing surface yet require no lubrication for ease of operation. The plastic materials also provide quiet operation even when metallic parts are carried thereacross.

Referring specifically to Figure 4 it will be seen that the load bearing flight 22 of the conveyor has each rod 40 thereof supported at three places. More specifically the bearing members 52 support each rod 40 adjacent the ends thereof but within links 42. In addition each rod 40 is supported by bearing member 96 at substantially the center thereof. Because of this construction, substantial loads can be placed upon the rods 40.

Also referring to Figure 4 it can be seen that the outermost ends of rods 40 are disposed inwardly with respect to plates 46 of the longitudinal frame members 12 and 14. Accordingly, all moving parts of conveyor 20 are included within the boundaries of frame members 12 and 14.

The return flight 24 of conveyor 20 is also supported. More specifically the bearing members 64 contact and support the rods 40 at a point spaced immediately inwardly from the links 42. The support flanges 56 and 60 need not have any substantial mechanical strength since conveyor flight 24 bears no load. Accordingly, the cleaning apertures 66 do not seriously weaken the frame members although the connecting portions 68 are of relatively small extent compared to the longitudinal extent of the frame member 12 and 14.

The sanitary character of the conveyor is apparent from Figure 4. There are no flat horizontal surfaces of any appreciable size located between frame member 12 and 14. The only flat surfaces presented are those of the upper edges of links 42. These areas are relatively small and are continually being dumped at the ends of the conveyor. The frame itself is so constructed specifically to eliminate collection of dirt and food particles. Any dirt, waste material, crumbs or the like which may fall from articles carried by flight 22 of the conveyor will fall downwardly between rods 40 to the floor below where the material can be swept up from time to time. None of this material will lodge upon or be collected upon the conveyor itself. The open construction of all parts of the conveyor including the frame is such that the conveyor may easily be inspected and quickly cleaned and sterilized when desired.

Although one preferred embodiment of the invention has been shown in the drawings for purposes of illustration it is to be understood that various changes and modifications can be made therein without departing from the spirit and scope of the invention. Accordingly, the invention is to be limited only as set forth in the following claims.

I claim:

1. A conveyor comprising a pair of longitudinally extending stationary frame members, each of said frame members including a substantially vertically disposed plate, said plates being mounted substantially parallel to each other, an inwardly and upwardly directed flange formed on the upper edge of each of said plates, an upstanding support rail formed on the upper edge of each of said flanges, each of said support rails having a bearing surface, a conveyor belt including a plurality of rods disposed transversely with respect to said frame members, the bodies of said rods being disposed upon and supported fully by said bearing surfaces, and links interconnecting said rods, said bearing surfaces engaging the bodies of said rods adjacent the ends thereof at points spaced inwardly from said links and providing sliding point contact therewith during movement of said bolt.

2. A conveyor comprising a pair of longitudinally extending stationary frame members, each of said frame members including a substantially vertically disposed plate, said plates being mounted substantially parallel to each other, an inwardly and upwardly directed flange formed on the upper edge of each of said plates, an upstanding support rail formed on the upper edge of each of said flanges, a bearing member positioned on each support rail and having a rounded support surface, a conveyor belt including a plurality of rods disposed transversely with respect to said frame members, the bodies of said rods being disposed upon and supported by said bearing members, and links interconnecting said rods, said bearing members engaging the bodies of said rods adjavent the ends thereof at points spaced inwardly from said links and providing sliding point contact with the bodies of said rods during movement of said belt.

3. A conveyor comprising a pair of longitudinally extending stationary frame members, each of said frame members including a substantially vertically disposed plate, said plates being mounted substantially parallel to each other, a first inwardly and upwardly directed flange formed on the upper edge of each of said plates, a first upstanding support rail formed on the upper edge of each of said first flanges, each of said first support rails having a bearing surface, a second inwardly and upwardly directed flange formed on the lower edge of each of said plates, a second upstanding support rail formed on the upper edge of each of said second flanges, each of said second support rails having a bearing surface, an endless conveyor belt including a plurality of rods disposed transversely with respect to said frame members, the bodies of said rods being disposed upon and supported by said bearing surfaces, and links interconnecting said rods, said first support rails engaging the bodies of said rods adjacent the ends thereof at points spaced inwardly from said links and providing sliding point contact therewith along the upper reach of said conveyor belt, said second support rails engaging the bodies of said rods adjacent the ends thereoef at points spaced inwardly from said links and providing sliding point contact therewith along the lower reach of said conveyor belt.

4. A conveyor comprising a pair of longitudinally extending stationary frame members, each of said frame members including a substantially vertically disposed plate, said plates being mounted substantially parallel to each other, a first inwardly and upwardly directed flange formed on the upper edge of each of said plates, a first upstanding support rail formed on the upper edge of each of said first flanges, each of said first support rails having a bearing surface, a second inwardly and upwardly directed flange formed on the lower edge of each of said plates, the junction of said plates and said second flanges having apertures formed therein having longitudinal extents substantially greater than the remaining portions connecting said plates and said second flanges, a second upstanding support rail formed on the upper edge of each of said flanges, each of said second support rails having a bearing surface, an endless conveyor belt including a plurality of rods having bodies disposed transversely with respect to said frame members and disposed directly upon and supported by said bearing surfaces, and links interconnecting said rods, said first support rails engaging the bodies of said rods adjacent the ends thereof at points spaced inwardly from said links and providing sliding point contact therewith along the upper reach of said conveyor belt, said second support rails engaging the bodies of said rods adjacent the ends thereof at points spaced inwardly from said links and providing sliding point contact therewith along the lower reach of said conveyor belt.

5. A conveyor comprising a pair of longitudinally extending stationary frame members, each of said frame members including a substantially vertically disposed plate, said plates being mounted substantially parallel to each other, a first inwardly and upwardly directed flange formed on the upper edge of each of said plates, a first upstanding support rail formed on the upper edge of each of said first flanges, each of said first support rails having a bearing surface, a V-shaped flange formed on the lower edge of each of said plates and directed inwardly therefrom, a second support rail formed on the upper edge of each of said V-shaped flanges, each of said second support rails being disposed beneath the corresponding first support rail and having a bearing surface, a conveyor belt including a plurality of rods having bodies disposed transversely with respect to said frame members and disposed directly upon and supported by said bearing surfaces, and links interconnecting said rods, said bearing surfaces slidably engaging the bodies of said rods adjacent the ends thereof at points spaced inwardly from said links and providing sliding point contact therewith.

6. A conveyor as set forth in claim 5, wherein the apices of said V-shaped flanges are apertured, the longitudinal extent of the apertures being substantially greater than the remaining connecting portions whereby to permit material to drop therethrough.

7. A conveyor comprising a pair of longitudinally extending stationary frame members, each of said frame members including a substantially vertically disposed plate, said plates being mounted substantially parallel to each other, an inwardly and upwardly directed flange formed on the upper edge of each of said plates, an upstanding support rail formed on the upper edge of each of said flanges, each of said support rails having a bearing surface, transverse frame members interconnecting said plates, the point of connection between said transverse frame members and said plates being disposed beneath said inwardly directed flanges, the upper surfaces of said transverse frame members sloping downwardly, a conveyor belt including a plurality of rods having bodies disposed transversely with respect to said frame members and disposed directly upon and supported fully by said bearing surfaces, and links interconnecting said rods, said bearing surfaces engaging the bodies of said rods adjacent the ends thereof at points spaced inwardly from said links and providing sliding point contact therewith.

8. A conveyor comprising a pair of longitudinally extending stationary frame members, each of said frame members including a substantially vertically disposed plate, said plates being mounted substantially parallel to each other, an inwardly and upwardly directed flange formed on the upper edge of each of said plates, an upstanding support rail formed on the upper edge of each of said flanges, each of said support rails having a bearing surface, transverse frame members interconnecting said plates, the point of connection between said transverse members and said plates being disposed beneath said inwardly directed flanges, the upper surfaces of said transverse frame members sloping downwardly, an intermediate bearing member mounted on said transverse frame members and extending substantially parallel to said support rails and having an upwardly directed bearing surface in general horizontal alignment with the bearing surfaces on said support rails, a conveyor belt including a plurality of rods having bodies disposed transversely with respect to said frame members and disposed directly upon and supported fully by said bearing surfaces, and links interconnecting said rods, said bearing surfaces engaging the bodies of said rods adjacent the ends thereof at points spaced inwardly from said links and providing sliding point contact therewith.

References Cited in the file of this patent
UNITED STATES PATENTS

| | | |
|---|---|---|
| 1,031,501 | Wooster | July 2, 1912 |
| 1,109,674 | Gallaher | Sept. 8, 1914 |
| 1,209,021 | Phillips | Dec. 19, 1916 |
| 2,234,537 | Blackburn | Mar. 11, 1941 |
| 2,628,705 | Kline et al. | Feb. 17, 1953 |
| 2,747,725 | Hatch et al. | May 29, 1956 |
| 2,753,039 | Velten et al. | July 3, 1956 |
| 2,816,453 | Frank et al. | Dec. 17, 1957 |

UNITED STATES PATENT OFFICE
CERTIFICATION OF CORRECTION

Patent No. 2,969,870

January 31, 1961

Willis Clark Pulver

It is hereby certified that error appears in the above numbered patent requiring correction and that the said Letters Patent should read as corrected below.

Column 5, line 53, for "bolt" read -- belt --; lines 67 and 68, for "adjavent" read -- adjacent --; column 6, line 1 for "thereoef" read -- thereof --.

Signed and sealed this 4th day of July, 1961.

(SEAL)
Attest:

ERNEST W. SWIDER
Attesting Officer

DAVID L. LADD
Commissioner of Patents